US012281371B2

(12) United States Patent
Ha et al.

(10) Patent No.: US 12,281,371 B2
(45) Date of Patent: Apr. 22, 2025

(54) RADIANT TUBE APPARATUS AND METHOD FOR MANUFACTURING SAME

(71) Applicants: POSCO, Pohang-si (KR); RESEARCH INSTITUTE OF INDUSTRIAL SCIENCE & TECHNOLOGY, Pohang-si (KR)

(72) Inventors: Won Ha, Pohang-si (KR); Mok Young Lee, Pohang-si (KR)

(73) Assignees: POSCO, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 311 days.

(21) Appl. No.: 17/785,698

(22) PCT Filed: Nov. 25, 2020

(86) PCT No.: PCT/KR2020/016828
§ 371 (c)(1),
(2) Date: Jun. 15, 2022

(87) PCT Pub. No.: WO2021/125601
PCT Pub. Date: Jun. 24, 2021

(65) Prior Publication Data

US 2023/0046285 A1 Feb. 16, 2023

(30) Foreign Application Priority Data

Dec. 17, 2019 (KR) ........................ 10-2019-0169104

(51) Int. Cl.
*F28F 1/12* (2006.01)
*C21D 1/34* (2006.01)
(Continued)

(52) U.S. Cl.
CPC ............... *C21D 9/562* (2013.01); *C21D 1/34* (2013.01); *F23C 3/002* (2013.01); *F23D 14/151* (2021.05);
(Continued)

(58) Field of Classification Search
CPC .... F28F 1/12; F28F 1/105; F28F 1/122; F28F 1/126; F28F 1/128; F23D 11/443;
(Continued)

(56) References Cited

U.S. PATENT DOCUMENTS 2,642,858 A 6/1953 Plesset et al.
2018/0031274 A1* 2/2018 Wilson ...................... F28F 1/24

FOREIGN PATENT DOCUMENTS

EP 2676093 B1 8/2018
JP 49-13 Y 1/1974
(Continued)

OTHER PUBLICATIONS

Office Action issued Jul. 4, 2023 for corresponding Japanese Patent Application No. 2022-536755.
(Continued)

*Primary Examiner* — Gregory A Wilson
(74) *Attorney, Agent, or Firm* — Morgan, Lewis & Bockius LLP

(57) ABSTRACT

The present invention relates to a radiant tube apparatus disposed in a heat treatment facility to perform a heat treatment of a strip and a method for manufacturing the same. The radiant tube apparatus includes a tube having an internal pipe, wherein the tube has a first continuous pattern and a second continuous pattern extending side by side and spaced apart from each other at a predetermined distance on a surface, and, in each of the first continuous pattern and the second continuous pattern, a plurality of unit patterns having
(Continued)

a predetermined height from the surface are connected to each other in a longitudinal direction.

4 Claims, 12 Drawing Sheets

(51) Int. Cl.
*C21D 9/56* (2006.01)
*F23C 3/00* (2006.01)
*F23D 14/12* (2006.01)
*F27B 9/36* (2006.01)

(52) U.S. Cl.
CPC ............... *F23C 2900/03009* (2013.01); *F27B 2009/3638* (2013.01)

(58) Field of Classification Search
CPC ........ F23D 11/445; F23D 14/10; F23D 14/12; F27B 9/068
See application file for complete search history.

(56) References Cited

FOREIGN PATENT DOCUMENTS

| | | | | | |
|---|---|---|---|---|---|
| JP | 61003826 | A | * | 1/1986 | C21D 1/34 |
| JP | H2-259322 | A | | 10/1990 | |
| JP | H03-87321 | A | | 4/1991 | |
| JP | H7-280207 | A | | 10/1995 | |
| JP | 2002-174403 | A | | 6/2002 | |
| JP | 2002-349807 | A | | 12/2002 | |
| JP | 2014-505231 | A | | 2/2014 | |
| JP | 2018-194214 | A | | 12/2018 | |
| KR | 20000017464 | U | * | 9/2000 | |
| KR | 10-2002-0072617 | A | | 9/2002 | |
| KR | 10-1620383 | B1 | | 5/2016 | |
| KR | 20160108951 | A | * | 9/2016 | |
| KR | 10-2016-0130501 | A | | 11/2016 | |
| KR | 10-1694211 | B1 | | 1/2017 | |
| KR | 10-2017-0045000 | A | | 4/2017 | |
| KR | 20170045000 | A | * | 4/2017 | |
| KR | 10-1734384 | B1 | | 5/2017 | |
| KR | 10-2018-0125518 | A | | 11/2018 | |
| RU | 2058400 | C1 | | 4/1996 | |
| RU | 2461452 | C2 | | 4/2008 | |
| RU | 2494844 | C2 | | 4/2009 | |
| RU | 2606285 | C2 | | 2/2012 | |
| RU | 2653738 | C1 | | 5/2018 | |
| SU | 1740440 | A1 | | 6/1992 | |

OTHER PUBLICATIONS

International Search Report dated May 17, 2021 issued in International Patent Application No. PCT/KR2020/016828 (with English translation).
Extended European Search Report dated Dec. 11, 2023 issued in European Patent Application No. 20903022.0.

* cited by examiner

RADIANT TUBE APPARATUS AND METHOD FOR MANUFACTURING SAME

CROSS-REFERENCE OF RELATED APPLICATIONS

This application is the U.S. National Phase under 35 U.S.C. § 371 of International Patent Application No. PCT/KR2020/016828, filed on Nov. 25, 2020, which in turn claims the benefit of Korean Application No. 10-2019-0169104, filed on Dec. 17, 2019, the entire disclosures of which applications are incorporated by reference herein.

TECHNICAL FIELD

The present invention relates to a radiant tube apparatus disposed in a heat treatment facility to perform a heat treatment of a heat treatment target material and a method for manufacturing the same.

BACKGROUND ART

Metal materials machined in various ways such as casting, forging, rolling, and extrusion are heat-treated at a specific temperature to realize a desired strength and crystal size, or pass through a heat treatment furnace maintained at a specific temperature for surface treatment.

While being heat-treated, metal materials such as strips and plates may be oxidized due to oxygen present in an annealing furnace. In order to suppress the formation of oxides, a heat treatment in an inert atmosphere such as nitrogen or argon or in a vacuum state is used. When heat treatment in an inert atmosphere or vacuum state is required, a heating element using electricity is sometimes used as a heat source, but a method of using heat generated when gas is burned with a burner is suitable for a low-cost heat treatment of mass products. Here, since the burner cannot be directly burned in an inert atmosphere without oxygen required for gas combustion, a radiant tube equipped with a burner is used.

Even in a normal atmospheric atmosphere, not an inert atmosphere, if a flame is directly sprayed, the strip may be unevenly heated and discolored, and thus, the flame generated by the burner circulates inside the radiant tube to heat the radiant tube and the strip is indirectly heated by radiant heat emitted from the heated radiant tube. The radiant tube may be manufactured by casting a tube shape using a casting method or by making a plate material have a tube shape and welding a curved tube and a straight tube to each other.

Meanwhile, there has been an attempt to increase thermal efficiency of the radiant tube by forming a negative electrode protrusion on a surface using a centrifugal casting method or by forming a pattern in a plurality of polygons on a surface of the radiant tube.

However, since a height of the negative electrode protrusion cannot exceed a thickness of the surface of the radiant tube, there is a limit to improving the thermal efficiency. In addition, a polygon forming the pattern is arranged to share one side with an adjacent polygon to limit a shape that may be implemented, and an intermittent pattern formation reduces the productivity of a continuous pattern that may be formed per unit time. In addition, when one pattern constituting the continuous pattern comes into contact with another pattern, a surface area emitting radiant heat is reduced as much as the contact area, so an increase in thermal efficiency is also limited, which is pointed out as a problem.

DISCLOSURE

Technical Problem

An object of the present invention is to provide a radiant tube apparatus in which a plurality of continuous patterns formed to be parallel with other patterns by a predetermined distance are printed on a surface of a radiant tube to increase a radiant heat emission surface area, and a method for manufacturing the same.

Technical Solution

A radiant tube apparatus according to one aspect of the present invention includes a tube having an internal pipe, wherein the tube has a first continuous pattern and a second continuous pattern extending side by side and spaced apart from each other at a predetermined distance on a surface, and, in each of the first continuous pattern and the second continuous pattern, a plurality of unit patterns having a predetermined height from the surface are connected to each other in a longitudinal direction.

The tube may include a plurality of straight pipe portions extending in a straight line; and a curved pipe portion coupled to an end of the straight pipe portion so that the plurality of straight pipe portions are positioned to be parallel.

In the first continuous pattern, a plurality of first unit patterns including one of a hypotenuse and a vertical side of a right-angled triangle may be connected to each other to form a zigzag shape, and, in the second continuous pattern, a plurality of second unit patterns formed of a straight line may be connected to each other to form a straight line.

In the first continuous pattern, a plurality of first unit patterns including two sides having a predetermined included angle may be connected in a longitudinal direction to form a sawtooth shape, and in the second continuous pattern, a plurality of second unit patterns formed as a straight line may be connected to each other to form a straight line.

In each of the first continuous pattern and the second continuous pattern, a plurality of unit patterns including one of the hypotenuse and a vertical side of a right-angled triangle may be connected to each other in a longitudinal direction to form a zigzag shape, and a center of the unit pattern constituting the second continuous pattern may be configured by moving in parallel by a predetermined distance in the longitudinal direction from the center of the unit pattern constituting the first continuous pattern.

In each of the first continuous pattern and the second continuous pattern, a plurality of unit patterns including two sides having a predetermined included angle may be connected in a longitudinal direction to form a sawtooth shape, and a center of the unit pattern constituting the second continuous pattern may be configured by moving in parallel by a predetermined distance in the longitudinal direction from the center of the unit pattern constituting the first continuous pattern.

In the first continuous pattern, a plurality of first unit patterns including three sides vertically connected to an inside and one side vertically connected to an outside may be connected in a longitudinal direction to form a concavo-convex shape, and in the second continuous pattern, a plurality of second unit patterns formed of straight lines may be connected in the longitudinal direction to form a straight line.

In each of the first continuous pattern and the second continuous pattern, a plurality of unit patterns including three sides vertically connected to an inside and one side vertically connected to an outside may be connected in a longitudinal direction to form a concavo-convex shape.

In the first continuous pattern, a plurality of first unit patterns including three sides vertically connected to an inside and one side vertically connected to an outside may be connected in a longitudinal direction to form a concavo-convex shape, and, in the second continuous pattern, a plurality of second unit patterns having three sides vertically connected to the inside may be positioned to enter a convex inside of the first unit pattern at a predetermined interval and may be intermittently arranged to be formed in the longitudinal direction.

In the first continuous pattern, a plurality of first unit patterns including three sides vertically connected to an inside and one side vertically connected to an outside may be connected in a longitudinal direction to form a concavo-convex shape, and in the second continuous pattern, a plurality of second unit patterns including a first straight line and a second straight line vertically coupled to the first straight line may be positioned to enter the convex inside of the first unit pattern at a predetermined interval and connected to be formed in the longitudinal direction.

In a method for manufacturing a radiant tube apparatus according to another feature of the present invention, a radiant tube apparatus is manufactured by printing a first continuous pattern and a second continuous pattern extending side by side and spaced apart from each other at a predetermined interval on a surface of a tube having an internal pipe through a three-dimensional modeling method.

In a method for manufacturing a radiant tube apparatus according to another feature of the present invention, a radiant tube apparatus is manufactured by welding a first continuous pattern and a second continuous pattern extending side by side and spaced apart from each other at a predetermined interval on a surface of a tube having an internal pipe through any one method among a cold metal transfer (CMT), a tungsten inert gas (TIG), and a metal inert gas (MIG).

Advantageous Effects

The radiant tube apparatus capable of improving heat treatment efficiency in an annealing furnace by improving radiant heat efficiency, and the method for manufacturing the same are provided.

MODE FOR INVENTION

Hereinafter, the exemplary embodiments of the present invention will be described with reference to the accompanying drawings, in which like numbers refer to like elements throughout although the exemplary embodiments are different, and a redundant description thereof is omitted. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. Also, the present invention is not limited to a specific disclosed form, but includes all modifications, equivalents, and substitutions without departing from the scope and spirit of the present invention.

It will be understood that, although the terms first, second, etc. may be used herein to describe various elements, these elements should not be limited by these terms. These terms are only used to distinguish one element from another.

It is to be understood that when one element is referred to as being "connected to" or "coupled to" another element, it may be connected directly to or coupled directly to another element or be connected to or coupled to another element, having the other element intervening therebetween. Meanwhile, it is to be understood that when one element is referred to as being "connected directly to" or "coupled directly to" another element, it may be connected to or coupled to another element without the other element intervening therebetween.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Figure 1:
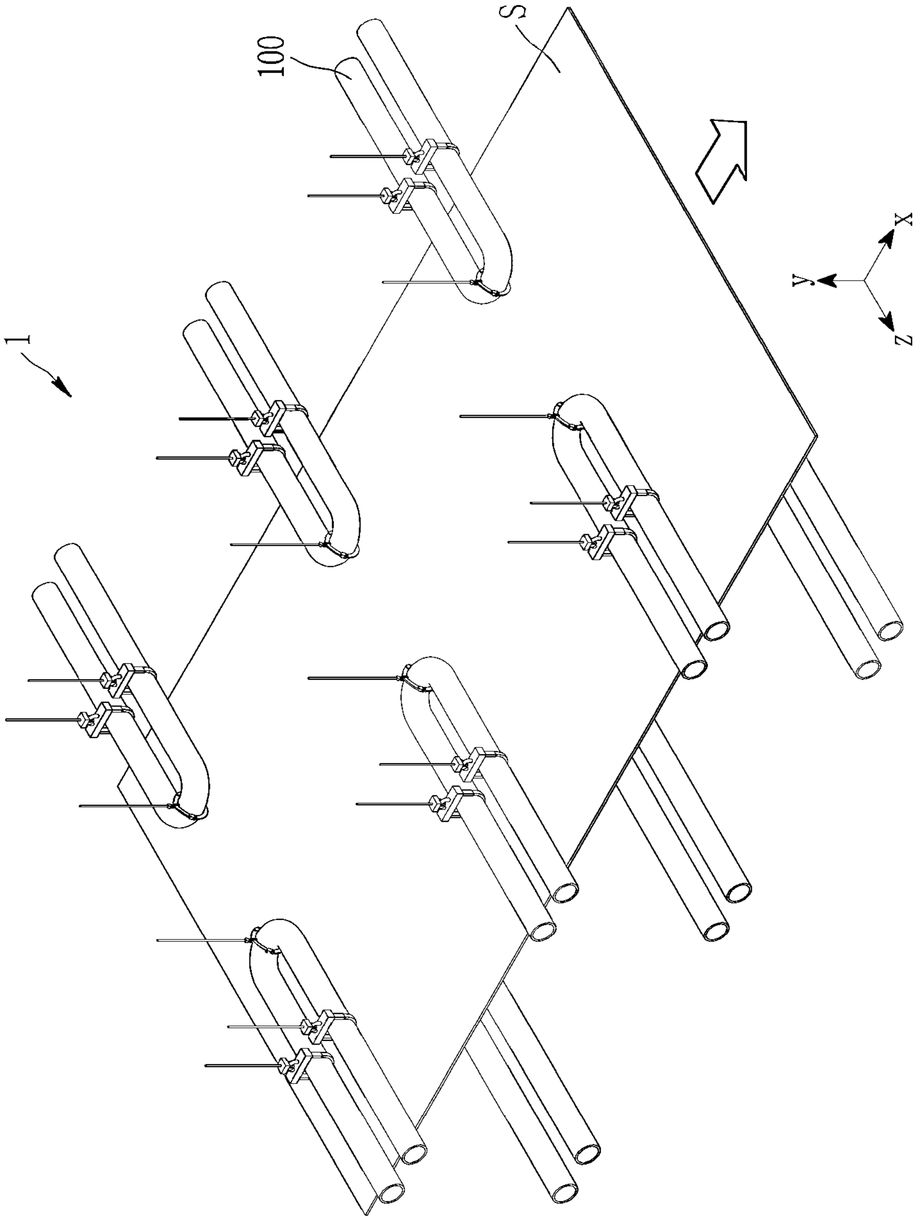
FIG. 1 is a view illustrating a heat treatment of a strip passing through an inside of a heat treatment facility according to an exemplary embodiment.
Figure 2:
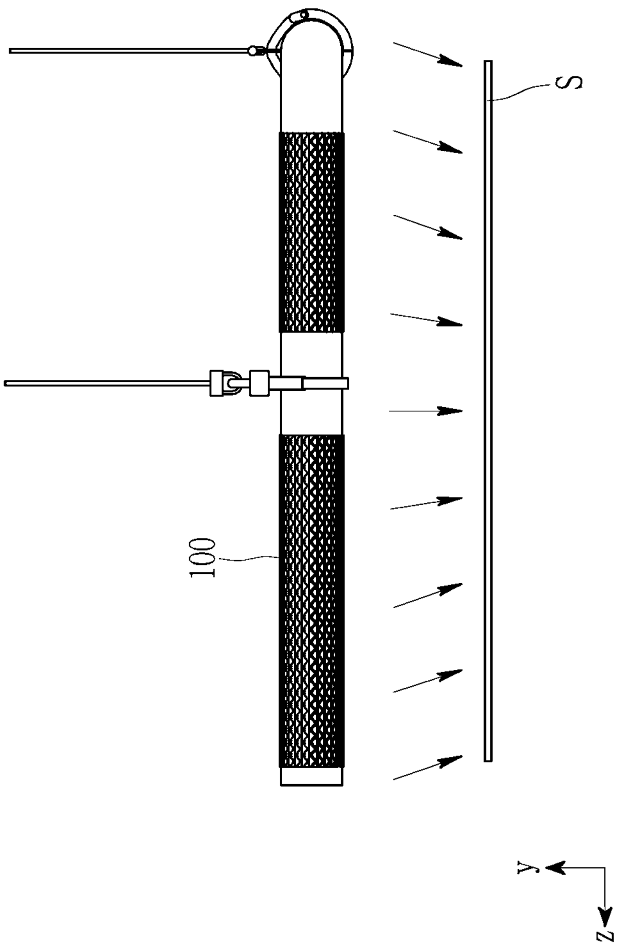
FIG. 2 is a view illustrating an example in which a strip is heat-treated by radiant heat emitted from a radiant tube apparatus of FIG. 1.
Figure 3:
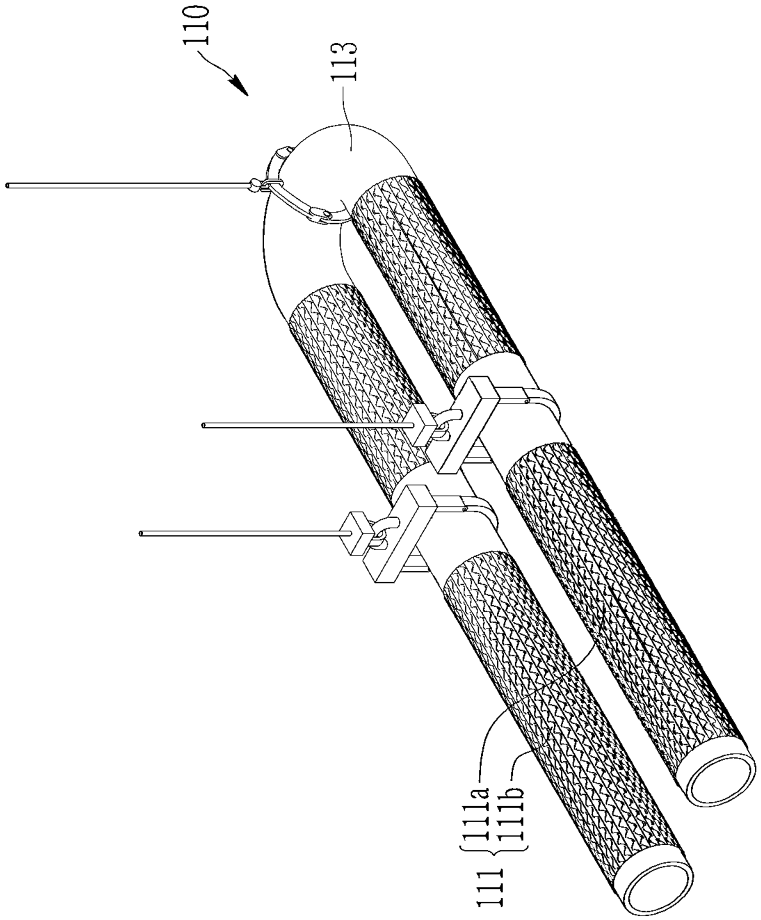
FIG. 3 is a view showing the radiant tube apparatus of FIG. 1 in detail.

FIG. 1 is a view illustrating a heat treatment of a strip passing through an inside of a heat treatment facility according to an exemplary embodiment, FIG. 2 is a view illustrating an example in which the strip is heat-treated by radiant heat emitted from a radiant tube apparatus of FIG. 1, FIG. 3 is a view showing the radiant tube apparatus of FIG. 1 in detail, and FIGS. 4 to 12 are views showing various exemplary embodiments of a continuous pattern positioned on a surface of the radiant tube of FIG. 1.

As shown in FIG. 1, a radiant tube apparatus 100 heats a metal material (strip, hereinafter, "strip") S passing through a heat treatment furnace 1 maintained at a specific temperature for surface treatment. The radiant tube apparatus 100 may be installed in the heat treatment furnace 1, but is not limited thereto, and may be installed in various other heat treatment facilities.

Referring to FIG. 2, a flame generated by a combustion nozzle (not shown) circulates an inside of the radiant tube apparatus 100 to heat the radiant tube apparatus 100, and the strip S is heated indirectly by radiant heat emitted from the heated radiant tube apparatus 100. Here, the combustion nozzle sprays and burns gas, liquid, and powder fuel to heat the radiant tube apparatus 100. For example, the combustion nozzle includes, but is not limited to, a burner, and may include various combustion devices that may be installed in the radiant tube apparatus 100. The strip S is a metal material machined in various ways, such as casting, forging, rolling, extrusion, and may include, for example, a steel plate.

Referring to FIG. 3, the radiant tube apparatus 100 includes a tube 110 having an internal pipe through which heat heated by a flame passes. When the tube 110 is heated by a flame generated therein, radiant heat is emitted to the outside to heat a low-temperature strip S. Then, oxidation of the strip S is prevented.

The tube 110 may include a plurality of straight pipe portions 111*a* and 111*b*: 111 extending in a straight line and a curved pipe portion 113 coupled to ends of the plurality of straight pipe portions 111*a* and 111*b*: 111 so that the plurality of straight pipe portions 111*a* and 111*b*: 111 are arranged to be parallel to each other to have a U shape. For example, the tube 110 may be formed to have a U shape or a W shape depending on a size and heating temperature of the strip S, but is not limited thereto.

The tube 110 includes a plurality of continuous patterns formed on an outer surface thereof. In this case, a surface area for emitting radiant heat increases, thereby increasing radiant heat efficiency. As a height of the continuous pattern increases, the surface area increases, thereby increasing the radiant heat efficiency, but the height may be set to an optimal height depending on a location where the radiant tube apparatus 100 is installed or a distance from other adjacent devices.

Referring to FIGS. 4 to 12, the continuous pattern includes a first continuous pattern 300 and a second continuous pattern 400 that are spaced apart from each other and extend side by side. Specifically, the first continuous pattern 300 and the second continuous pattern 400 are independent patterns that do not contact each other and do not share constituent sides, are spaced apart from each other, and extend side by side.

Each of the first continuous pattern 300 and the second continuous pattern 400 may be formed by connecting a plurality of unit patterns having a predetermined height from an outer surface of the tube 110 in a longitudinal direction. For example, the continuous pattern may be printed through a 3D additive manufacturing method (hereinafter, "3D printing") such as a directed energy deposition (DED) method, an overlay welding method using cold metal transfer (CMT), tungsten inert gas (TIG), metal inert gas (MIG), etc.

In FIG. 4A, a view illustrating a first unit pattern 310 including one of a hypotenuse and a vertical side of a right-angled triangle, FIG. 4B is a view illustrating a second unit pattern 410 including a straight line, and FIG. 4C is a view illustrating a plurality of first continuous patterns 300, in which a plurality of first unit patterns 310 are connected in a longitudinal direction to form a zigzag shape, and a plurality of second continuous patterns 400, in which a plurality of second unit patterns 410 are connected in a longitudinal direction to form a straight line, are printed.

Figure 4:
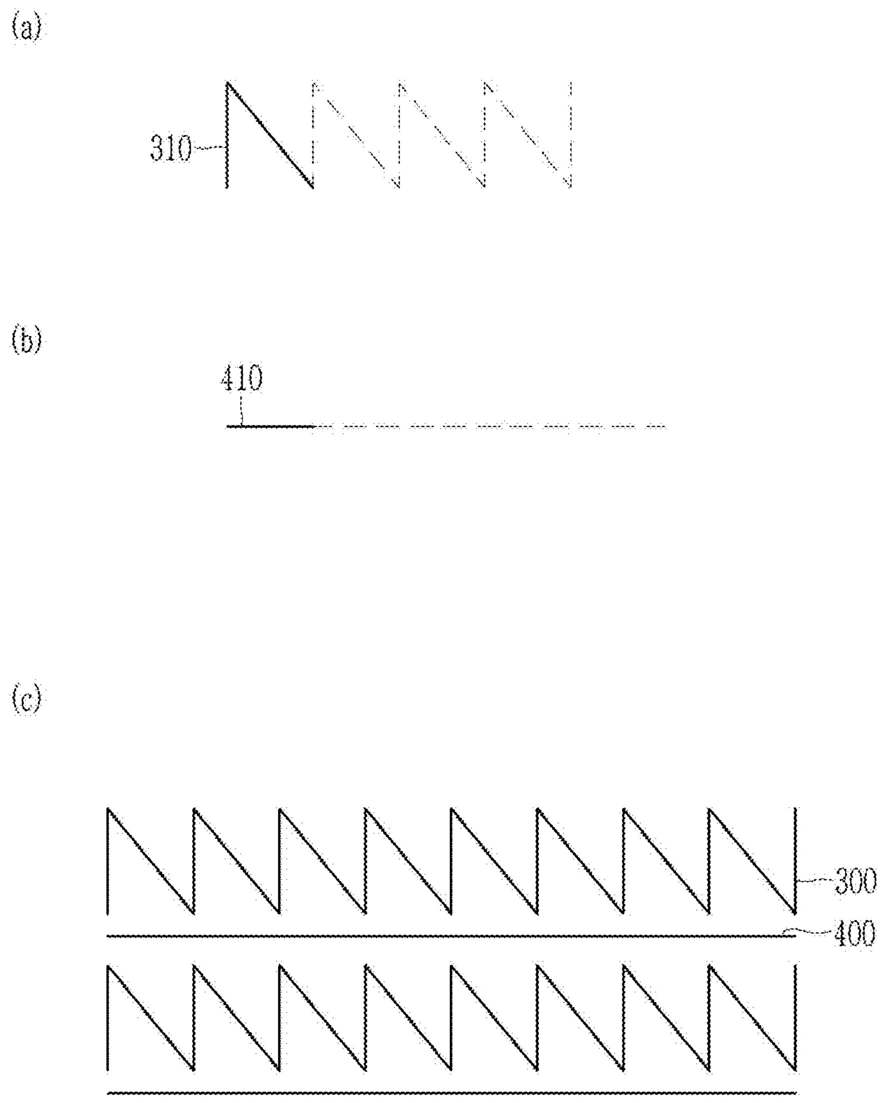
FIG. 4 is a view showing an exemplary embodiment of a zigzag pattern positioned on a surface of the radiant tube of FIG. 1.
Figure 5:
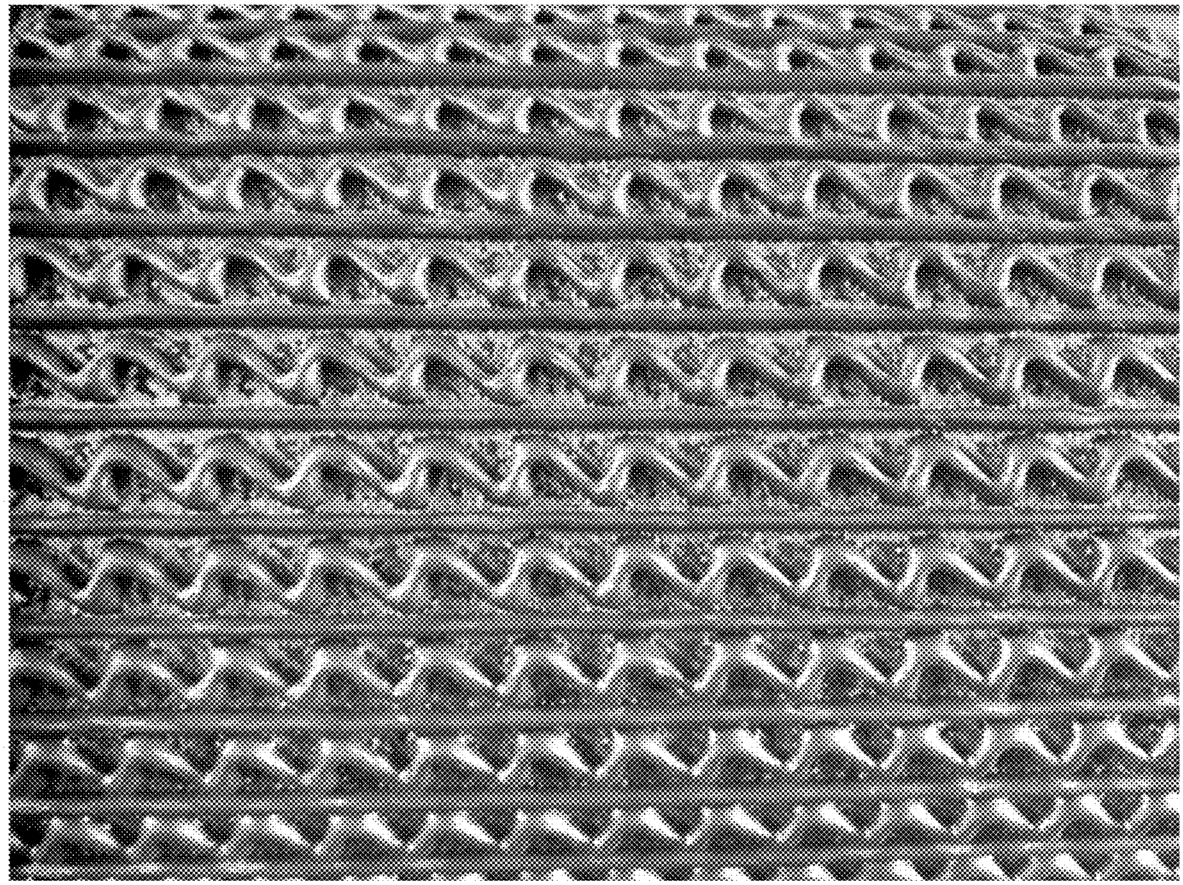
FIG. 5 is an image view illustrating the zigzag pattern of FIG. 4.
Figure 6:
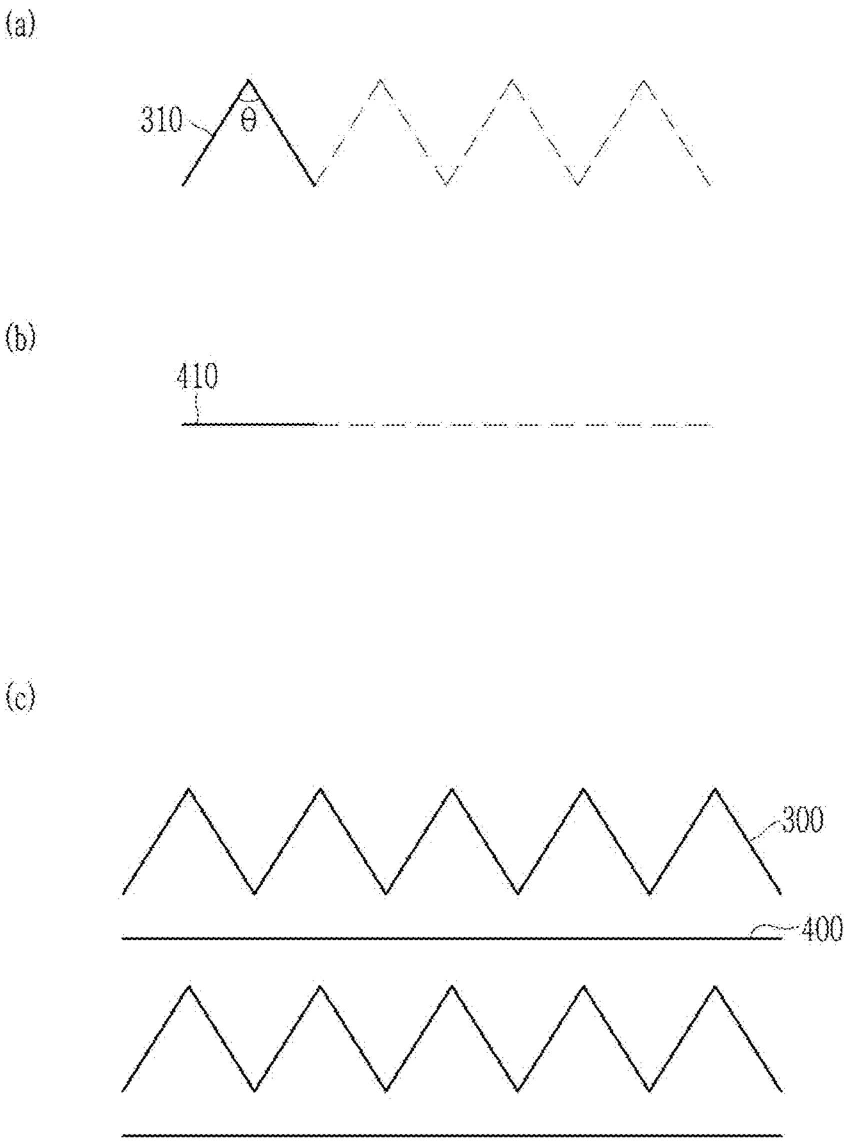
FIG. 6 is a view showing an exemplary embodiment of a sawtooth pattern positioned on the surface of the radiant tube of FIG. 1.
Figure 7:
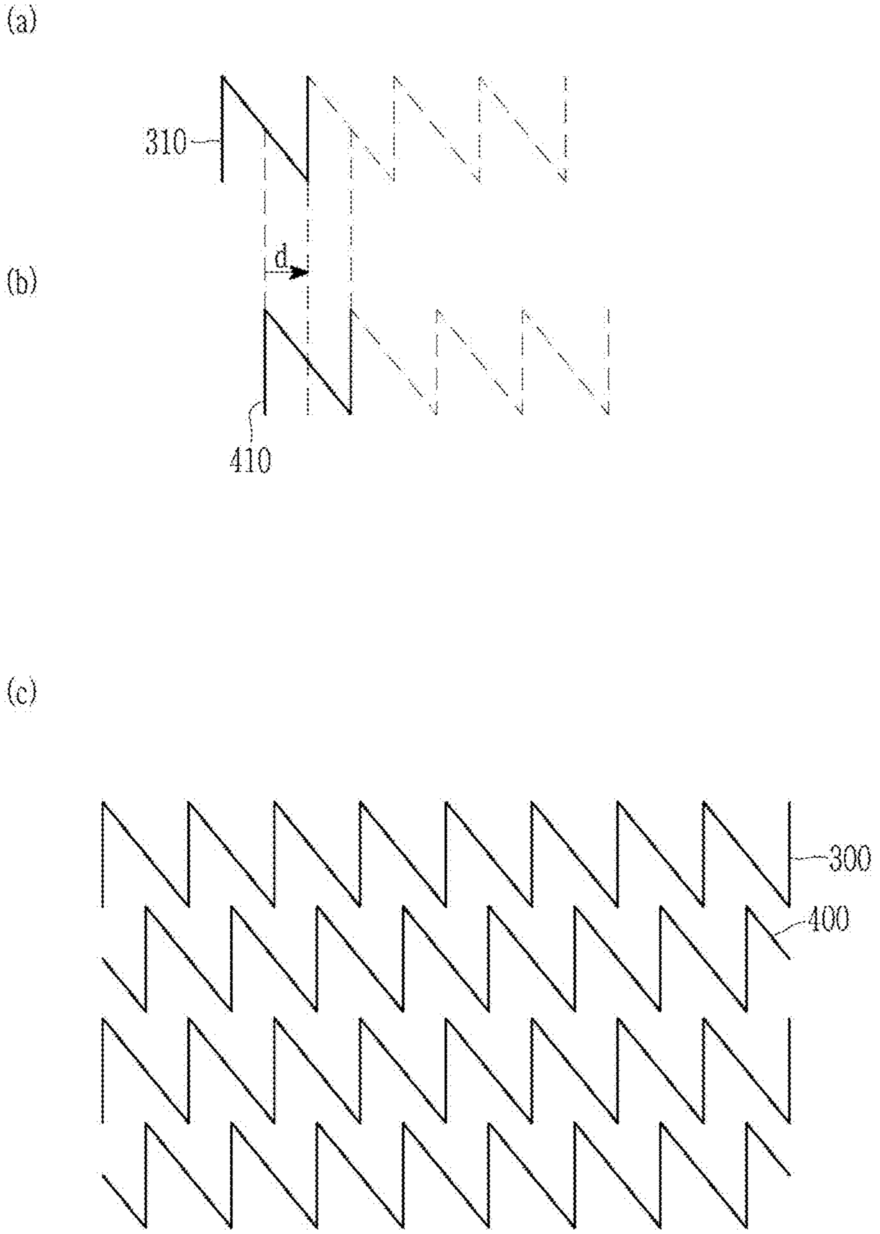
FIG. 7 is a view showing another exemplary embodiment of a zigzag pattern positioned on the surface of the radiant tube of FIG. 1.
Figure 8:
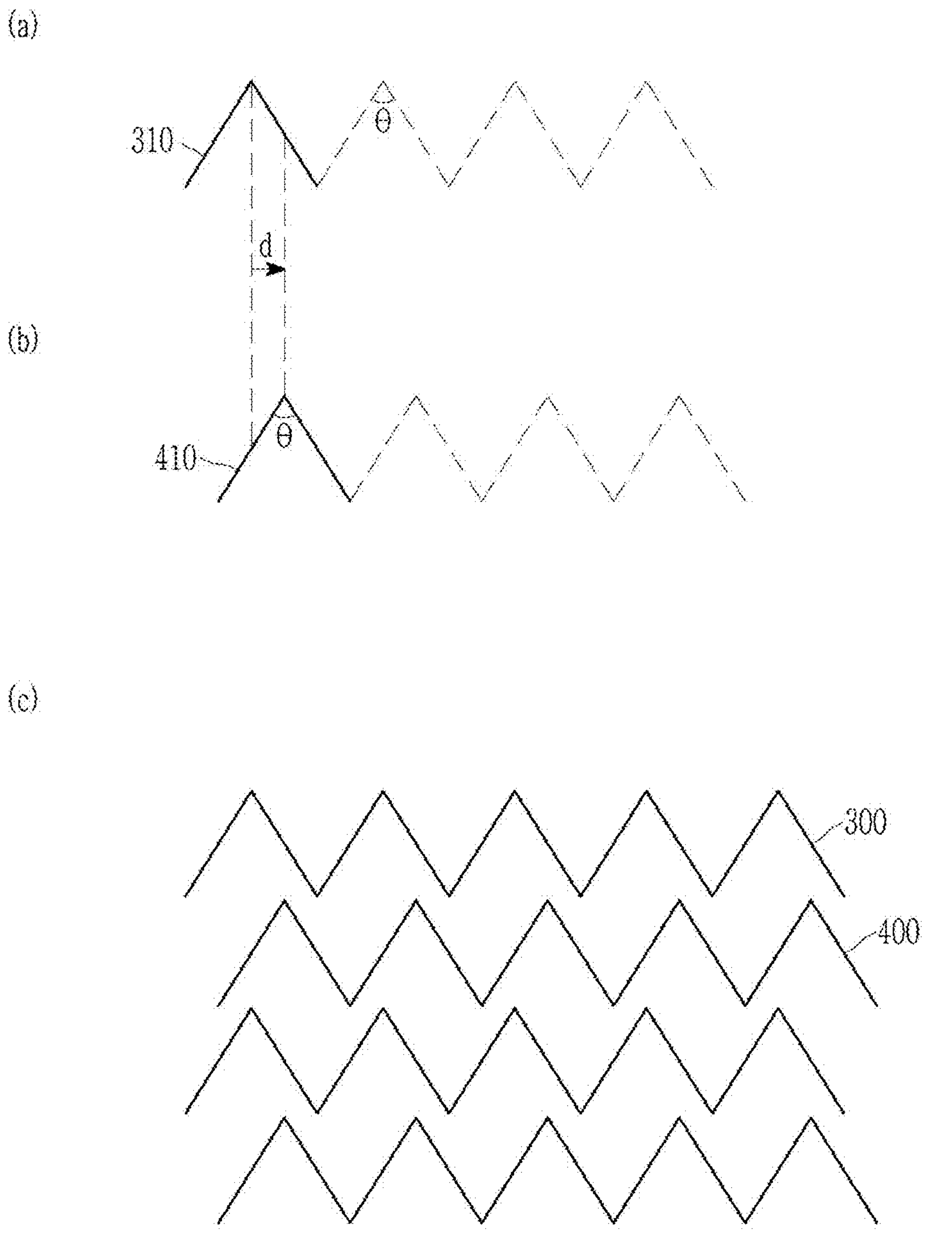
FIG. 8 is a view showing another exemplary embodiment of a sawtooth pattern positioned on the surface of the radiant tube of FIG. 1.
Figure 9:
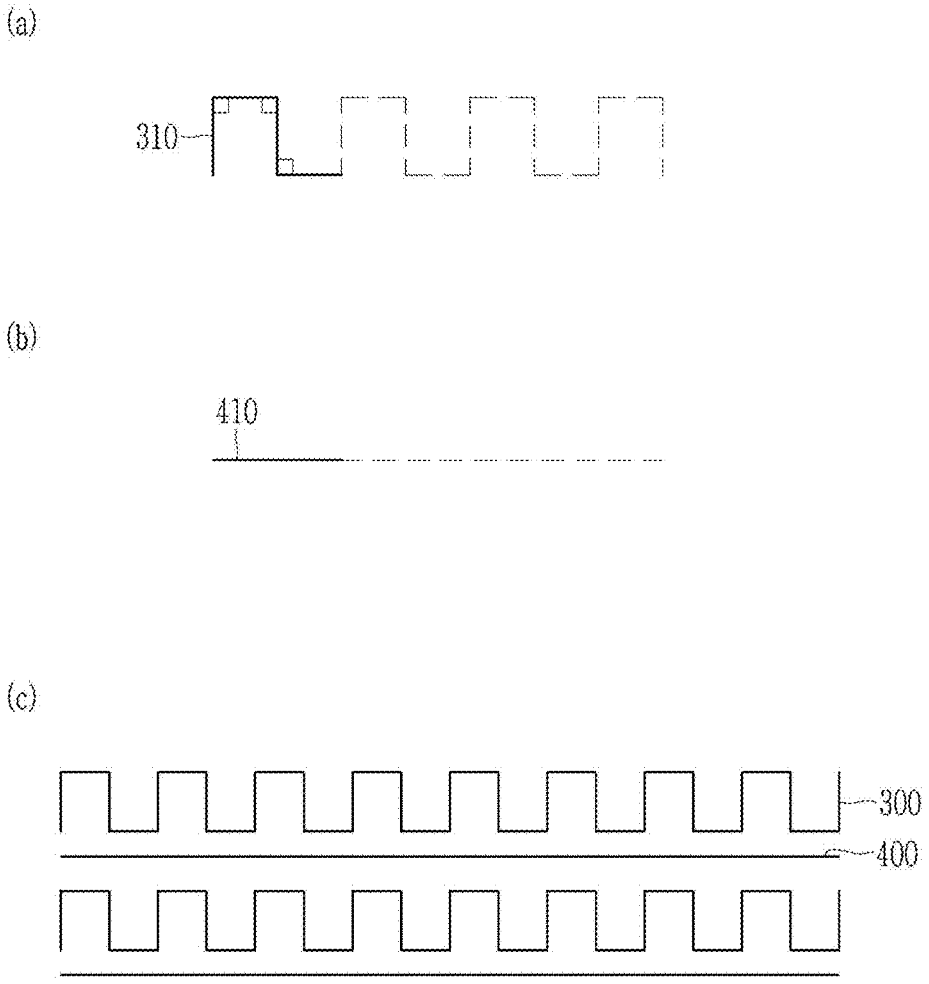
FIG. 9 is a view showing an exemplary embodiment of the concavo-convex pattern positioned on the surface of the radiant tube of FIG. 1.
Figure 10:
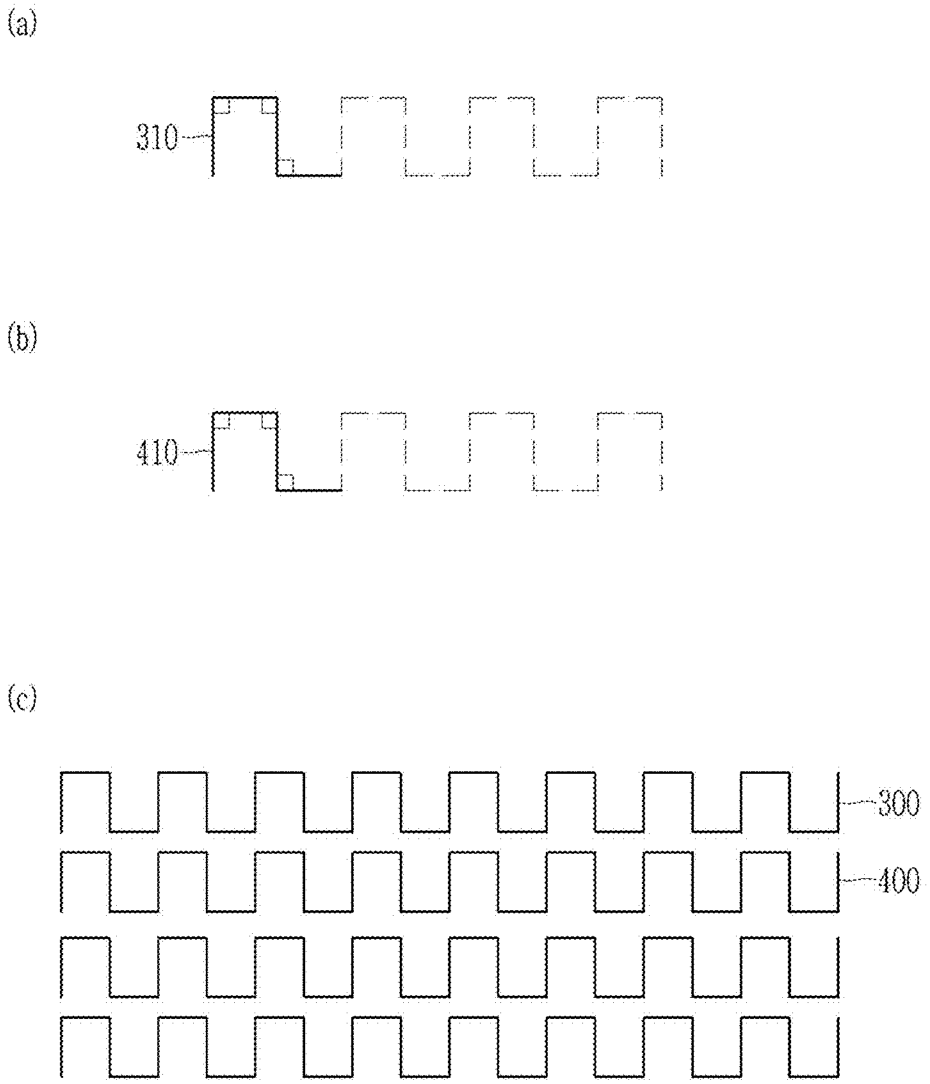
FIG. 10 is a view showing another exemplary embodiment of the concavo-convex pattern positioned on the surface of the radiant tube of FIG. 1.
Figure 11:
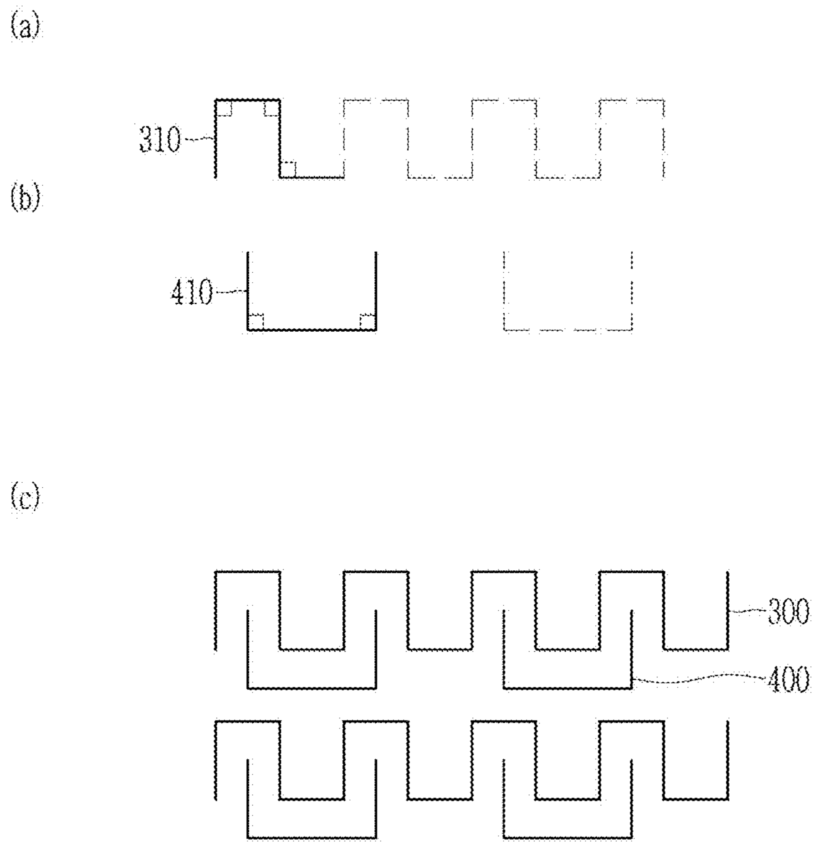
FIG. 11 is a view showing another exemplary embodiment of the concavo-convex pattern positioned on the surface of the radiant tube of FIG. 1.
Figure 12:
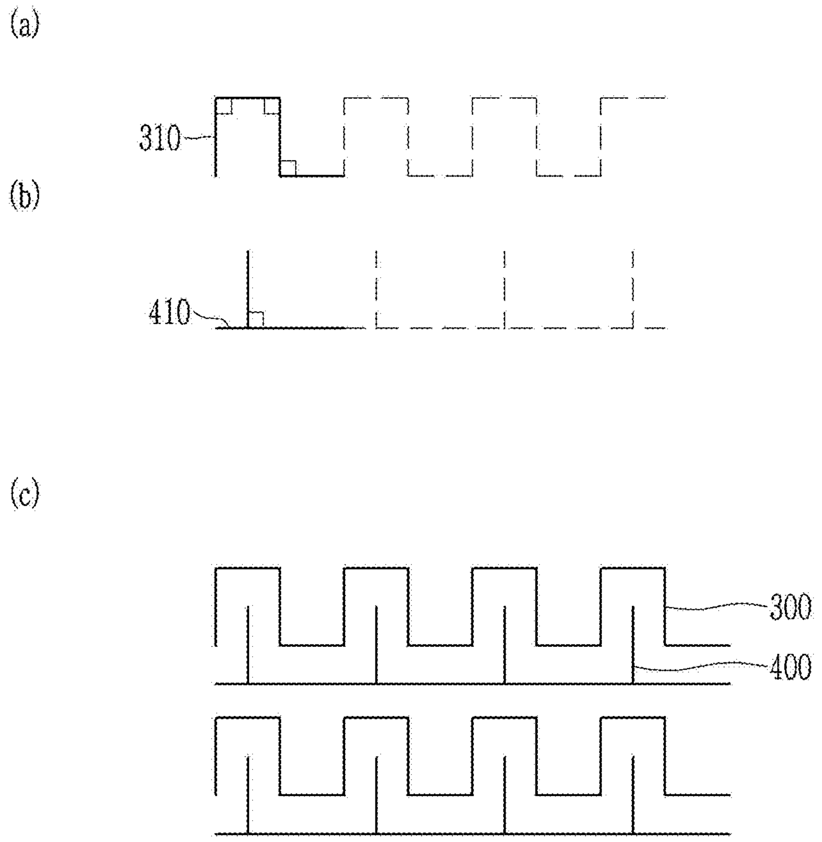
FIG. 12 is a view showing another exemplary embodiment of the concavo-convex pattern positioned on the surface of the radiant tube of FIG. 1.

As shown in FIG. 5, a plurality of first continuous patterns 300 and a plurality of second continuous patterns 400 shown in FIG. 4C may be formed on the outer surface of the tube 110. For example, when the continuous pattern shown in FIG. 5 is formed on the outer surface of the tube 110 by CMT welding, a height of the continuous pattern may be 3 mm or greater and a height/thickness ratio of the continuous pattern may be 1.0 or greater, thereby increasing radiant heat emission efficiency. Specifically, by performing welding under conditions in which a diameter of a welding wire may be 0.6 mm or more and 1.5 mm or less, a welding current may be 70A or more, a welding voltage may be 8V or greater and 12V or less, a contact tip to work distance (CTWD) may be 10 mm or greater and 40 mm or less, and a welding speed is 0.3 m/min or greater and 0.7 m/min or less, the height of the continuous pattern may be 3 mm or greater and the height/thickness ratio of the continuous pattern may be 1.0 or greater. In addition, the first continuous pattern 300 and the second continuous pattern 400 are not limited to the CMT welding method, but are formed by various welding methods such as tungsten inert gas (TIG) or metal inert gas (MIG).

For example, in the case of forming the first continuous pattern 300 and the second continuous pattern 400 shown in FIGS. 4 and 5 by printing 44 unit pattern pairs on one radiant tube apparatus 100 with a height of 3.34 mm, the radiant heat emission efficiency is improved by 13.38%, compared with the radiant tube apparatus 100 on which nothing is printed. Compared with a 8.6% improvement in radiant heat emission efficiency of a honeycomb pattern compared with a radiant tube apparatus 100 in which nothing is printed under the same conditions, improvement of radiant heat of the first continuous pattern 300 and the second continuous pattern 400 is remarkable.

In addition, the first continuous pattern 300 and the second continuous pattern 400 shown in FIGS. 4 and 5 may be formed in contact with each other. That is, a point of the first continuous patterns 300 adjacent to the second continuous pattern 400 may be formed to be directly connected to the second continuous pattern 400. The pattern formed by partially contacting the first continuous pattern 300 and the second continuous pattern 400 has a radiant heat emission efficiency improved by 12.2% compared with the radiant tube apparatus 100 in which nothing is printed.

FIG. 6A is a view illustrating a first unit pattern 310 including two sides having a predetermined included angle θ°, FIG. 6B is a view illustrating a second unit pattern 410 including a straight line, and FIG. 6C is a view illustrating a plurality of first continuous patterns 300, in which a plurality of first unit patterns 310 are connected in a longitudinal direction to form a sawtooth shape, and a plurality of second continuous patterns 400, in which a plurality of second unit patterns 410 are connected in a longitudinal direction to form a straight line, are printed. Here, the predetermined included angle θ° may be configured as an arbitrary angle belonging to more than θ° and less than 180°, which is also equally applied in the following description.

FIG. 7A is a view illustrating a first unit pattern 310 including one of a hypotenuse and a vertical side of a right-angled triangle, FIG. 7B is a view illustrating a second unit pattern 410 including one of a hypotenuse and a vertical side of a right-angled triangle and having a center moved in parallel by a predetermined distance d in a longitudinal direction from a center of the first unit pattern 310, and FIG. 7C is a view illustrating a plurality of first continuous patterns 300, in which a plurality of first unit patterns 310 are connected in a longitudinal direction to form a zigzag shape, and a plurality of second continuous patterns 400, in which a plurality of second unit patterns 410 are connected in a longitudinal direction to form a zigzag shape, are printed. For example, the predetermined distance d may be set to be shorter than a horizontal interval between the first unit pattern 310 and the second unit pattern 410, which is also equally applied in the following description.

FIG. 8A is a view illustrating a first unit pattern 310 including two sides having a predetermined included angle θ°, FIG. 8B is a view illustrating a second unit pattern 410 including two sides having a predetermined included angle θ° and having a center moved in parallel by a predetermined distance d in a longitudinal direction from a center of the first unit pattern 310, and FIG. 8C is a view illustrating a plurality of first continuous patterns 300, in which a plurality of first unit patterns 310 are connected in a longitudinal direction to form a sawtooth shape, and a plurality of second continuous patterns 400, in which a plurality of second unit patterns 410 are connected in a longitudinal direction to form a sawtooth shape, are printed.

FIG. 9A is a view illustrating a first unit pattern 310 including three sides vertically connected to an inside and one side vertically connected to an outside, FIG. 9B is a view illustrating a second unit pattern 410 including a straight line, and FIG. 9C is a view illustrating a plurality of first continuous patterns 300, in which a plurality of first unit patterns 310 are connected to each other in a longitudinal direction to form a concavo-convex shape, and a plurality of second continuous patterns 400, in which a plurality of second unit patterns 410 are connected to each other in the longitudinal direction to form a straight line, are printed.

FIG. 10A and FIG. 10B are views illustrating a first unit pattern 310 and a second unit pattern 410 in which one of the four sides constituting the quadrangle extends vertically to the outside of the other adjacent side, respectively, and FIG. 10C is a view illustrating a plurality of first continuous patterns 300, in which a plurality of first unit patterns 310 are connected to each other in a longitudinal direction to form a concavo-convex shape, and a plurality of second continuous patterns 400, in which a plurality of second unit patterns 410 are connected to each other in a longitudinal direction to form a concavo-convex shape, are printed.

FIG. 11A is a view illustrating a first unit pattern 310 including three sides vertically connected to an inside and one side vertically connected to an outside, FIG. 11B is a view illustrating a second unit pattern 410 including three sides vertically connected to an inside, and FIG. 11C (e) is a view illustrating a plurality of first continuous patterns 300, in which a plurality of first unit patterns 310 are connected to each other in a longitudinal direction to form a concavo-convex shape, and a plurality of second continuous patterns 400 in which a plurality of second unit patterns 410 positioned to enter to a convex inner side of the first continuous pattern 300 by a predetermined interval are intermittently arranged, are printed. In this case, the second unit pattern 410 may be positioned to enter a predetermined interval within a range in which the second unit pattern 410 is not in contact with the convex inside of the first continuous pattern 300.

FIG. 12A is a view illustrating a first unit pattern 310 including three sides vertically connected to an inside and one side vertically connected to an outside, FIG. 12B is a view illustrating a second unit pattern 410 including a first straight line 411 and a second straight line 413 vertically coupled to an arbitrary position of the first straight line 411, and FIG. 12C is a view illustrating a plurality of first continuous patterns 300, in which a plurality of first unit patterns 310 are connected to each other in a longitudinal direction to form a concavo-convex shape, and a plurality of second continuous patterns 400, in which the second straight line 413 is positioned to enter by a predetermined interval to a convex inside of the first continuous pattern 300 and connected to each other in the longitudinal direction, are printed. In this case, the second straight line 413 of the second unit pattern 410 may be positioned to enter by a predetermined interval within a range in which the second straight line 413 is not in contact with the convex inside of the first continuous pattern 300.

Although the exemplary embodiments of the present invention have been described in detail above, the scope of the present invention is not limited thereto, and various modifications and improvements by those of ordinary skill in the art to which the present invention pertains are also provided.

The invention claimed is:

1. A radiant tube apparatus comprising:

a tube having an internal pipe, wherein:

the tube has a first continuous pattern and a second continuous pattern extending side by side in a longitudinal direction and alternatively positioned in a transverse direction on a surface of the tube, in the first continuous pattern, a plurality of first unit patterns having a first predetermined height from the surface are sawtooth-shaped and are connected to each other in the longitudinal direction of the tube, causing the first continuous pattern to have a zigzag shape, in the second continuous pattern, a plurality of second unit patterns having a second predetermined height from the surface are linear and are connected to each other in the longitudinal direction, causing the second continuous pattern to have a bar shape, and the first predetermined height and the second predetermined height are 3 mm or greater and a height/thickness ratio of the first unit pattern and the second unit pattern is 1.0 or greater.

2. The radiant tube apparatus of claim 1, wherein:

the tube includes a plurality of straight pipe portions extending in a straight line; and a curved pipe portion coupled to an end of the straight pipe portion so that the plurality of straight pipe portions are positioned to be parallel.

3. A method for manufacturing the radiant tube apparatus according to claim 1 by printing the first continuous pattern and the second continuous pattern on the surface of the tube through a three-dimensional modeling method.

4. A method for manufacturing the radiant tube apparatus according to claim 1 by welding the first continuous pattern and the second continuous pattern on the surface of the tube through any one method among a cold metal transfer (CMT), a tungsten inert gas (TIG), and a metal inert gas (MIG).

* * * * *